No Printed Specification Available
8422X
E. S. Scripture,
Cotton Press.
Patented Sep. 26, 1834
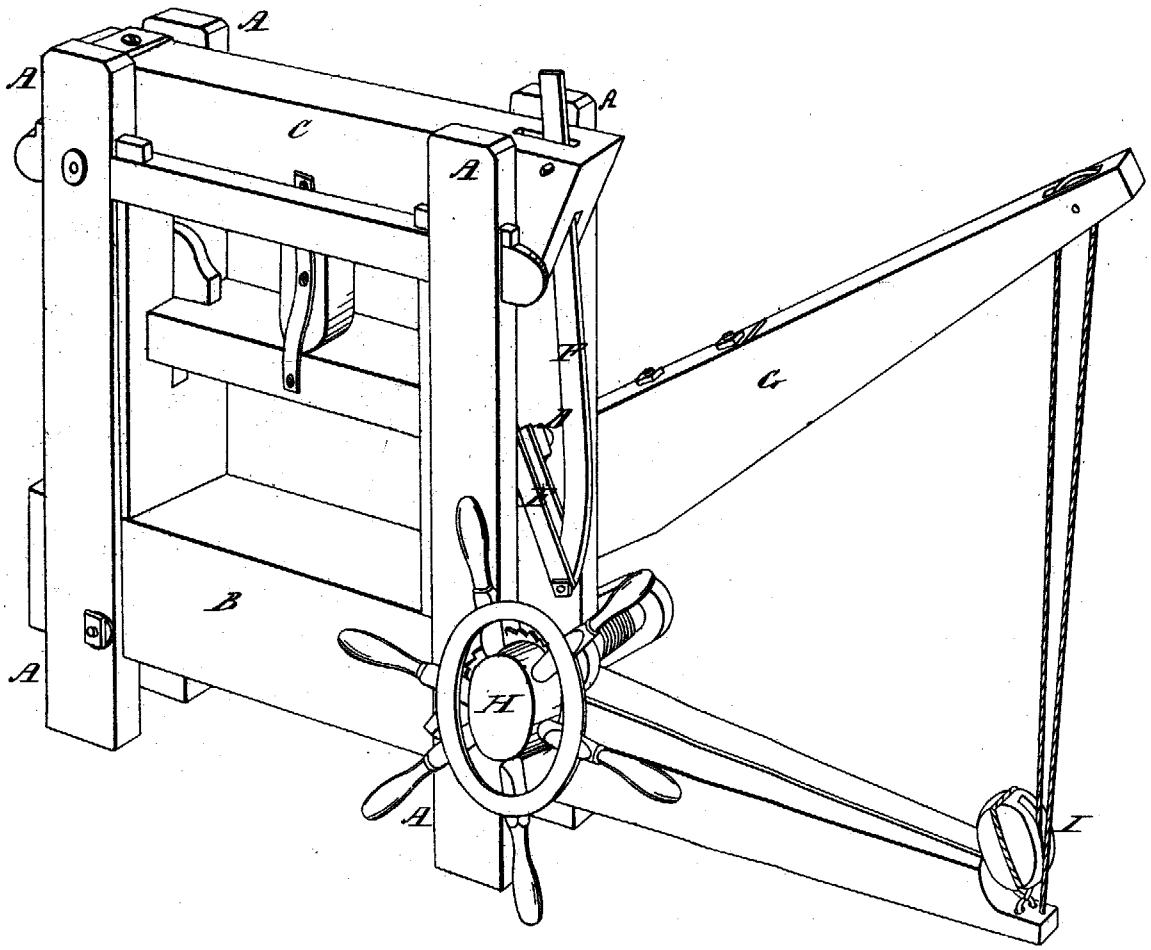

9/26/1834 8422X

Av 15

Sept. 26. 1834

Eliphalet S. Scripture
Letters Patent

The schedule referred to in these Letters Patent and making part of the same
containing a description in the words of the said Eliphalet S. Scripture
himself of his improvement called the centripetal Power Press.

---

To all to whom these presents shall come. Be it known that I Eliphalet
S. Scripture of the town of Cazenovia in the County of Madison and State
of New York have invented a new and useful improvement and principle
of the lever kind called the centripetal power press and the following is a
full and exact description of the construction and operation of said machine
as invented by me. Four posts or standards for large work and three for small
or work, strongly attached (by means of gains and bolts or in any other way
most convenient) to a bed piece of a chosen size and length at a distance from
each other that will comport with the use for which the press may be intended
and so far apart in the width as to admit a power beam or saddle of a chosen
dimention to play between them one end of the beam is suspended between
two of the posts or admitted through one post by means of a mortice when three
posts only are used, and there secured by a strong arbor or bolt in such a man-
ner as to admit the other end to play up and down at pleasure, between the
other two posts is suspended a tumbler or shaft from which project an arm
of a length suitable to the space required to perform the work for which the
the press may be intended, on the end of the arm (or what I call the moving
fulcrum) is a gain to receive the one end of an iron lever termed an elliptic
lever on account of its shape which must be such in a degree more or less
to admit the centre of its attachment to the moving fulcrum to turn under
the tumbler's centre which must range with a bolt that passes through the
power beam and head of the elliptic lever which is admitted through
the beam by means of a gain | To one end of the tumbler outside of one of the
posts is strongly attached a lever by means of wings on the shaft or tumbler
or a shank on the lever or in any way most convenient. This lever is
called the acting lever on account of its performing the greatest action Drawing

8422X in the operation of the press and when it is raised up it turns with it the
moving fulcrum which raises the end of the power beam to which the up-
per end of the elliptic lever is attached and when the acting lever is again
brought down it increases in its power in proportion as the moving fulcrum
approaches the line of the tumbler's centre consequently the power increases on
the beam as the substance under it becomes more and more condensed
with nearly a uniform force applied to the acting lever until it approach-
es a position which shall bring the moving fulcrum under the line of the
tumbler's centre or to a point which shall range the two attachments
of the elliptic lever under the line of the tumbler's center, hence the power
becomes infinite and the principle may with propriety be called a
natural one for condensing any substance whatever, And I have intended
this principle for the following purposes and have brought it into use for the most
of them viz. for printing, packing goods of every description required, Do
cotton, flour, tobacco & hops &c or any articles that may require to be pack-
ed; for extracting or expressing oils and juices of every description which
may require pressure in any degree more or less. designed too, for the clothier
for the paper maker, for the dairy-man and harness maker, for smoothing
any kind of article that requires pressure to do it. likewise for impress-
ing or sealing and punching and cutting metals of every description
The implements or stampers required to perform the abovementioned purposes
must be in a form that will comport with their use and may be placed un-
der the power beam or saddle at a chosen distance from either end and play in a
socket formed in the beam or in a piece of wood or metal attached thereto, when
a long follower is to be attached to the end of the stamper (as in the case of the cider
mill press) it must play with a joint at top. The acting lever may receive
its motion by the hand where the press is intended for light purposes, but for
heavy work the lever will be so long as to require ropes, or pulleys, a windlass,
&c which may be rigged in any way most convenient. In the above I have
endeavoured to give a concise description of the principle and the manner
of applying it to the various purposes above mentioned excepting a variation
of form for the printing press which requires two standards only one each
side of a bed sufficiently large to admit the size of the paper which is to to receive the impression. The shaft or tumbler is suspended between the two standards under the bed of the press with a projecting arm or ful-crum at each end of the same which play on the outside of the standards and there receive, each an lifting lever. the heads of which are attached to a saddle that passes through a gain or mortice in each standard after crossing a platten that hangs over the bed of the press. the acting lever is attach-ed to the shaft as before mentioned and may receive its motion by any method most convenient. I will endeavour to explain wherein presses on this principle may claim a superiority over any other lever presses now in use. The printing press requires by far the less quantity of metal to con-fine the same power which is obtained by a true circular motion of the moving fulcrums as in case of presses for all other purposes above mentioned. consequently the acting lever will start from any angle with the same ease according to the density of the substance to be pressed, which will in all cases correspond with the space and power; consequently much time and labor is saved in their operation compared with presses operating on oth-er principles. The drawing on fine paper is the form used for light purpos-es; the one on coarse paper for heavy work and will (I hope) give a satis-factory explanation of the manner of applying the principle to the various purposes herein mentioned. Presses constructed on this principle will vary in their proportion as to height, length, strength, &c according to the use for which they may be intended.

Witnesses
Avery Hawley
D. H. Johnson

E. S. [illegible]

Ex
Ckd 1275 2 Dr    Patented 26 Sep 1834